United States Patent
Olson et al.

(10) Patent No.: US 9,672,211 B1
(45) Date of Patent: Jun. 6, 2017

(54) SCRIPT UNIQUE PROMPTS

(71) Applicant: West Corporation, Omaha, NE (US)

(72) Inventors: Terry Olson, Bennington, NE (US);
John B. Bohan, Omaha, NE (US);
Mark L. Sempek, Blair, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 14/680,889

(22) Filed: Apr. 7, 2015

(51) Int. Cl.
*G10L 15/18* (2013.01)
*G06F 17/28* (2006.01)

(52) U.S. Cl.
CPC .................... *G06F 17/289* (2013.01)

(58) Field of Classification Search
CPC ......... G10L 15/22; G10L 15/08; G10L 15/19; G10L 15/063; G10L 15/183; G10L 15/222; G10L 2015/223; G06Q 10/10; G06Q 50/22; G06Q 10/02
USPC .............. 704/1–10, 270, 277, 251–255, 257, 704/E15.018–E15.019
See application file for complete search history.

(56) References Cited

U.S. PATENT DOCUMENTS

| | | | | |
|---|---|---|---|---|
| 6,477,492 B1* | 11/2002 | Connor | ................... | G10L 25/69 379/1.02 |
| 8,837,298 B2* | 9/2014 | Putnam | ................... | H04L 43/08 370/241 |
| 2005/0246174 A1* | 11/2005 | DeGolia | ........... | H04L 29/06027 704/270 |
| 2007/0219803 A1* | 9/2007 | Chiu | ....................... | G10L 15/22 704/270.1 |

* cited by examiner

*Primary Examiner* — Marivelisse Santiago Cordero
*Assistant Examiner* — Stephen Brinich

(57) ABSTRACT

Providing unique prompts for script, comprising sequencing, by a processor, at least one script in a design order having at least one prompt, identifying, by the processor, duplicate prompts of the at least one prompt, identifying, by the processor, unique prompts of the at least one prompt, translation tagging, by the processor, the identified unique prompts and replicating, by the processor, the translation tagged unique prompts to the identified duplicate prompts.

20 Claims, 18 Drawing Sheets

| Page Name<br>Bravo path: /voice/audio/comcast/EVR/ | Prompt Name | Prompt Text | State Name | Date Changed |
|---|---|---|---|---|
| GlobalOptions/SystemErrors | TechDiffVoiceRecDown | Sorry, we are experiencing technical difficulties. Please try your call again. Goodbye. | say_TechDiffVoiceRecDown | 5/22/2014 |
| GlobalOptions/SystemErrors | TechDiffFatalError | Sorry, we are experiencing technical difficulties. Please try your call again. Goodbye. | say_TechDiffFatalError | 5/22/2014 |
| GlobalOptions/SystemErrors | TechDiffAPIFail | Sorry, we are experiencing technical difficulties. Please try your call again. Goodbye. | say_TechDiffAPIFail | 5/22/2014 |
| GlobalOptions/SystemErrors | TechDiffDBFail | Sorry, we are experiencing technical difficulties. Please try your call again. Goodbye. | say_TechDiffDBFail | 5/22/2014 |
| Sales | SCPYNSales | Are you calling about your Seasonal Convenience Plan? Please say yes or no. | prompt_SCPYNSales | 8/18/2014 |
| Sales | SCPYNSalesNI1 | Again, are you calling about your Seasonal Convenience Plan? Please say yes or no. | prompt_SCPYNSales | 8/18/2014 |
| Sales | SCPYNSalesNI2 | If you're calling about your Seasonal Convenience Plan, press 1. Otherwise, press 2. | prompt_SCPYNSales | 8/18/2014 |
| Sales | SCPYNSalesMM1 | Sorry, just say yes or no. Are you calling about your Seasonal Convenience Plan? | prompt_SCPYNSales | 8/18/2014 |
| Sales | SCPYNSalesMM2 | If you're calling about your Seasonal Convenience Plan, press 1. Otherwise, press 2. | prompt_SCPYNSales | 8/18/2014 |
| Sales | SalesMenu_1 | Now you can say: 'add new service', 'change existing service', | prompt_SalesMenu | 9/12/2014 |

| Export Order | Batch Order | Record Order | Page Name | Prompt Name | Prompt Text | State Name | Date Changed |
|---|---|---|---|---|---|---|---|
| | | | Bravo path: /voice/audio/comcast/IVR/ | | | | |
| 1 | | | GlobalOptions/SystemErrors | TechDiffVoiceRecDown | Sorry, we are experiencing technical difficulties. Please try your call again. Goodbye. | say_TechDiffVoiceRecDown | 5/22/2014 |
| 2 | | | GlobalOptions/SystemErrors | TechDiffFatalError | Sorry, we are experiencing technical difficulties. Please try your call again. Goodbye. | say_TechDiffFatalError | 5/22/2014 |
| 3 | | | GlobalOptions/SystemErrors | TechDiffAppFail | Sorry, we are experiencing technical difficulties. Please try your call again. Goodbye. | say_TechDiffAppFail | 5/22/2014 |
| 4 | | | GlobalOptions/SystemErrors | TechDiffDBFail | Sorry, we are experiencing technical difficulties. Please try your call again. Goodbye. | say_TechDiffDBFail | 5/22/2014 |
| 5 | | | Sales | SCPYRSales | Are you calling about your Seasonal Convenience Plan? Please say yes or no. | prompt_SCPYRSales | 8/18/2014 |
| 6 | | | Sales | SCPYRSalesNM | Again, are you calling about your Seasonal Convenience Plan? Please say yes or no. | prompt_SCPYRSales | 8/18/2014 |
| 7 | | | Sales | SCPYRSalesMM2 | If you're calling about your Seasonal Convenience Plan, press 1. Otherwise, press 2. | prompt_SCPYRSales | 8/18/2014 |
| 8 | | | Sales | SCPYRSalesMM1 | Sorry, just say yes or no. Are you calling about your Seasonal Convenience Plan? | prompt_SCPYRSales | 8/18/2014 |
| 9 | | | Sales | SCPYRSalesMM2 | If you're calling about your Seasonal Convenience Plan, press 1. Otherwise, press 2. | prompt_SCPYRSales | 8/18/2014 |
| 10 | | | Sales | SalesMenu_1 | Now you can say 'add new service', 'change existing service', | prompt_SalesMenu | 9/12/2014 |

| Export Order | Batch Order | Record Order | Page Name | Prompt Name | Prompt Text | State Name | Date Changed | |
|---|---|---|---|---|---|---|---|---|
| | | | Bravo path: /voice/audio/comcast/IVR/ | | | | | |
| 6 | | | Sales | SCPYNSalesNM1 | Again, are you calling about your Seasonal Convenience Plan? Please say yes or no. | prompt_SCPYNSales | 8/18/2014 | a |
| 5 | | | Sales | SCPYNSales | Are you calling about your Seasonal Convenience Plan? Please say yes or no. | prompt_SCPYNSales | 8/18/2014 | a |
| 7 | | | Sales | SCPYNSalesNM2 | If you're calling about your Seasonal Convenience Plan, press 1. Otherwise, press 2. | prompt_SCPYNSales | 8/18/2014 | a |
| 9 | | | Sales | SCPYNSalesNMM2 | If you're calling about your Seasonal Convenience Plan, press 1. Otherwise, press 2. | prompt_SCPYNSales | 8/18/2014 | Dup |
| 10 | | | Sales | SalesMenu_1 | Now you can say: 'add new service', 'change existing service'. | prompt_SalesMenu | 9/12/2014 | a |
| 8 | | | Sales | SCPYNSalesNM1 | Sorry, just say yes or no. Are you calling about your Seasonal Convenience Plan? | prompt_SCPYNSales | 8/18/2014 | a |
| 11 | | | GlobalOptions/SystemErrors | TechDiffAPFailNM2 | n/a | say_TechDiffDBFail | 5/22/2014 | x |
| 1 | | | GlobalOptions/SystemErrors | TechDiffVoiceRecDown | Sorry, we are experiencing technical difficulties. Please try your call again. Goodbye. | say_TechDiffVoiceRecDown | 5/22/2014 | a |
| 2 | | | GlobalOptions/SystemErrors | TechDiffFatalError | Sorry, we are experiencing technical difficulties. Please try your call again. Goodbye. | say_TechDiffFatalError | 5/22/2014 | Dup |
| 3 | | | GlobalOptions/SystemErrors | TechDiffAPFail | Sorry, we are experiencing technical difficulties. Please try your call again. Goodbye. | say_TechDiffAPFail | 5/22/2014 | Dup |
| 4 | | | GlobalOptions/SystemErrors | TechDiffDBFail | Sorry, we are experiencing technical difficulties. Please try your call again. Goodbye. | say_TechDiffDBFail | 5/22/2014 | Dup |

Fig. 6

| Export Order | Batch Order | Record Order | Page Name Bravo path: /voice/audio/comcast/ENU/ | Prompt Name | Prompt Text | State Name | Date Changed | |
|---|---|---|---|---|---|---|---|---|
| 6 | | | Sales | SCPYRSalesNR1 | Again, are you calling about your Seasonal Convenience Plan? Please say yes or no. | prompt_SCPYRSales | 8/18/2014 | a |
| 5 | | | Sales | SCPYRSales | Are you calling about your Seasonal Convenience Plan? Please say yes or no. | prompt_SCPYRSales | 8/18/2014 | a |
| 7 | | | Sales | SCPYRSalesNM1 | If you're calling about your Seasonal Convenience Plan, press 1. Otherwise, press 2. | prompt_SCPYRSales | 8/18/2014 | a |
| 9 | | | Sales | SCPYRSalesNM2 | If you're calling about your Seasonal Convenience Plan, press 1. Otherwise, press 2. | prompt_SCPYRSales | 8/18/2014 | Dop |
| 10 | | | Sales | SalesMenu_1 | Now you can say: "add new service," "change existing service". | prompt_SalesMenu | 9/12/2014 | a |
| 8 | | | Sales | SCPYRSalesNM1 | Sorry, just say yes or no. Are you calling about your Seasonal Convenience Plan? | prompt_SCPYRSales | 8/18/2014 | a |
| 11 | | | GlobalOptions/SystemErrors | TechDiffAPNFailNR2 | n/a | say_TechDiffDefail | 5/22/2014 | t |
| 1 | | | GlobalOptions/SystemErrors | TechDiffVoiceRecDown | Sorry, we are experiencing technical difficulties. Please try your call again. Goodbye. | say_TechdiffVoiceRecDown | 5/23/2014 | a |
| 2 | | | GlobalOptions/SystemErrors | TechDiffFatalError | Sorry, we are experiencing technical difficulties. Please try your call again. Goodbye. | say_TechDiffFatalError | 5/22/2014 | Dop |
| 3 | | | GlobalOptions/SystemErrors | TechDiffAPIFail | Sorry, we are experiencing technical difficulties. Please try your call again. Goodbye. | say_TechDiffAPIFail | 5/22/2014 | Dop |
| 4 | | | GlobalOptions/SystemErrors | TechDiffDefail | Sorry, we are experiencing technical difficulties. Please try your call again. Goodbye. | say_TechDiffDefail | 5/22/2014 | Dop |

| Export Order | Batch Order | Record Order | Page Name Brsvo path: /voice/audio/comcast/IVR/ | Prompt Name | Prompt Text | State Name | Date Changed |
|---|---|---|---|---|---|---|---|
| 1 | | | GlobalOptions/SystemErrors | TechDiffVoiceRecDown | Sorry, we are experiencing technical difficulties. Please try your call again. Goodbye. | say_TechDiffVoiceRecDown | 5/22/2014 |
| 5 | | | Sales | SCPYNSales | Are you calling about your Seasonal Convenience Plan? Please say yes or no. | prompt_SCPYNSales | 8/18/2014 |
| 6 | | | Sales | SCPYNSalesRM1 | Again, are you calling about your Seasonal Convenience Plan? Please say yes or no. | prompt_SCPYNSales | 8/18/2014 |
| 7 | | | Sales | SCPYNSalesRM2 | If you're calling about your Seasonal Convenience Plan, press 1. Otherwise, press 2. | prompt_SCPYNSales | 8/18/2014 |
| 8 | | | Sales | SCPYNSalesMM1 | Sorry, just say yes or no. Are you calling about your Seasonal Convenience Plan? | prompt_SCPYNSales | 8/18/2014 |
| 10 | | | Sales | SalesMenu_1 | Now you can say: 'add new service', 'change existing service'. | prompt_SalesMenu | 9/11/2014 |
| 2 | | | GlobalOptions/SystemErrors | TechDiffFatalError | Sorry, we are experiencing technical difficulties. Please try your call again. Goodbye. | say_TechDiffFatalError | 5/22/2014 |
| 3 | | | GlobalOptions/SystemErrors | TechDiffAPIFail | Sorry, we are experiencing technical difficulties. Please try your call again. Goodbye. | say_TechDiffAPIFail | 5/22/2014 |
| 4 | | | GlobalOptions/SystemErrors | TechDiffDBFail | Sorry, we are experiencing technical difficulties. Please try your call again. Goodbye. | say_TechDiffDBFail | 5/22/2014 |
| 9 | | | Sales | SCPYNSalesRM2 | If you're calling about your Seasonal Convenience plan, press 1. Otherwise, press 2. | prompt_SCPYNSales | 8/18/2014 |
| 11 | | | GlobalOptions/SystemErrors | TechDiffAPIFailRM2 | n/a | say_TechDiffDBFail | 5/22/2014 |

| PL Order | Batch Order | Record Order | Page Name | Prompt Name | Prompt Text | State Name | Date Changed | |
|---|---|---|---|---|---|---|---|---|
| | | | Bravo path: /voice/audio/comcast/EN/R/ | | | | | |
| 1 | | 1 | GlobalOptions/SystemErrors | TechDiffVoiceRecDown | Sorry, we are experiencing technical difficulties. Please try your call again. Goodbye. | say_TechDiffVoiceRecDown | 5/22/2014 | a |
| 5 | | 2 | Sales | SCPYNSales | Are you calling about your Seasonal Convenience Plan? Please say yes or no. | prompt_SCPYNSales | 8/18/2014 | a |
| 6 | | 3 | Sales | SCPYNSalesNM1 | Again, are you calling about your Seasonal Convenience Plan? Please say yes or no. | prompt_SCPYNSales | 8/18/2014 | a |
| 7 | | 4 | Sales | SCPYNSalesNM2 | If you're calling about your Seasonal Convenience Plan, press 1. Otherwise, press 2. | prompt_SCPYNSales | 8/18/2014 | a |
| 8 | | 5 | Sales | SCPYNSalesMM1 | Sorry, just say yes or no. Are you calling about your Seasonal Convenience Plan? | prompt_SCPYNSales | 8/18/2014 | a |
| 10 | | 6 | Sales | SalesMenu_1 | Now you can say: 'add new service', 'change existing service', | prompt_SalesMenu | 9/12/2014 | a |
| 2 | | | GlobalOptions/SystemErrors | TechDiffFatalError | Sorry, we are experiencing technical difficulties. Please try your call again. Goodbye. | say_TechDiffFatalError | 5/22/2014 | Dup |
| 3 | | | GlobalOptions/SystemErrors | TechDiffAPIFail | Sorry, we are experiencing technical difficulties. Please try your call again. Goodbye. | say_TechDiffAPIFail | 5/22/2014 | Dup |
| 4 | | | GlobalOptions/SystemErrors | TechDiffDBFail | Sorry, we are experiencing technical difficulties. Please try your call again. Goodbye. | say_TechDiffDBFail | 5/22/2014 | Dup |
| 9 | | | Sales | SCPYNSalesNM2 | If you're calling about your Seasonal Convenience Plan, press 1. Otherwise, press 2. | prompt_SCPYNSales | 8/18/2014 | Dup |
| 11 | | | GlobalOptions/SystemErrors | TechDiffAPIFailN2 | n/a | say_TechDiffDBFail | 5/22/2014 | x |

Fig. 9

| Export Order | Batch Order | Record Order | Page Name Browse path: /voice/audio/comment/EWR/ | Prompt Name | Prompt Text | State Name | Date Changed |
|---|---|---|---|---|---|---|---|
| 3 | 1 | 3 | Sales | SCPWSalesNM1 | Again, are you calling about your Seasonal Convenience Plan? Please say yes or no. | prompt_SCPWSales | 8/18/2014 a |
| 5 | 2 | 2 | Sales | SCPWSales | Are you calling about your Seasonal Convenience Plan? Please say yes or no. | prompt_SCPWSales | 8/18/2014 a |
| 7 | 4 | 4 | Sales | SCPWSalesNM2 | If you're calling about your Seasonal Convenience Plan, press 1. Otherwise, press 2. | prompt_SCPWSales | 8/18/2014 a |
| 9 | 4 | 4 | Sales | SCPWSalesNM2 | If you're calling about your Seasonal Convenience Plan, press 1. Otherwise, press 2. | prompt_SCPWSales | 8/18/2014 Dup |
| 10 | 6 | 6 | Sales | SalesMenu_1 | Now you can say: 'add new service', 'change existing service', | prompt_SalesMenu | 9/12/2014 a |
| 8 | 5 | 5 | Sales | SCPWSalesNM1 | Sorry, just say yes or no. Are you calling about your Seasonal Convenience Plan? | prompt_SCPWSales | 8/18/2014 a |
| 1 | 1 | 1 | GlobalOptions/SystemErrors | TechDiffVoiceRecDown | Sorry, we are experiencing technical difficulties. Please try your call again. Goodbye. | say_TechDiffVoiceRecDown | 5/22/2014 a |
| 2 | 1 | 1 | GlobalOptions/SystemErrors | TechDiffStateError | Sorry, we are experiencing technical difficulties. Please try your call again. Goodbye. | say_TechDiffStateError | 5/22/2014 Dup |
| 3 | 1 | 1 | GlobalOptions/SystemErrors | TechDiffAPIFail | Sorry, we are experiencing technical difficulties. Please try your call again. Goodbye. | say_TechDiffAPIFail | 5/22/2014 Dup |
| 4 | 1 | 1 | GlobalOptions/SystemErrors | TechDiffDBFail | Sorry, we are experiencing technical difficulties. Please try your call again. Goodbye. | say_TechDiffDBFail | 5/22/2014 Dup |
| 11 | | | GlobalOptions/SystemErrors | TechDiffAPIFail2 | n/a | say_TechDiffDBFail | 5/22/2014 a |

| Export Order | Batch Order | Record Order | Page Name | Prompt Name | Prompt Text | State Name | Date Changed |
|---|---|---|---|---|---|---|---|
| | | | Base path: /voice/audio/consent/ENY/ | | | | |
| 1 | 1 | 1 | GlobalOptions/SystemErrors | TechDiffVoiceRecDown | Sorry, we are experiencing technical difficulties. Please try your call again. Goodbye. | say_TechDiffVoiceRecDown | 5/22/2014 a |
| 5 | 2 | 2 | Sales | SCPYNSales | Are you calling about your Seasonal Convenience Plan? Please say yes or no. | prompt_SCPYNSales | 8/18/2014 a |
| 6 | 3 | 3 | Sales | SCPYNSalesNM1 | Again, are you calling about your Seasonal Convenience Plan? Please say yes or no. | prompt_SCPYNSales | 8/18/2014 a |
| 7 | 4 | 4 | Sales | SCPYNSalesNM2 | If you're calling about your Seasonal Convenience Plan, press 1. Otherwise, press 2. | prompt_SCPYNSales | 8/18/2014 a |
| 8 | 5 | 5 | Sales | SalesMenu_1 | Sorry, just say yes or no. Are you calling about your Seasonal Convenience Plan? | prompt_SalesMenu | 9/12/2014 a |
| 10 | 6 | 6 | Sales | SalesMenu_1 | Now you can say: 'add new service', 'change existing service'. | prompt_SalesMenu | 8/18/2014 a |
| 9 | 4 | | Sales | SCPYNSalesNM2 | If you're calling about your Seasonal Convenience Plan, press 1. Otherwise, press 2. | prompt_SCPYNSales | 8/18/2014 Dup |
| 2 | 1 | | GlobalOptions/SystemErrors | TechDiffFaxError | Sorry, we are experiencing technical difficulties. Please try your call again. Goodbye. | say_TechDiffFaxError | 5/22/2014 Dup |
| 3 | 1 | | GlobalOptions/SystemErrors | TechDiffAPIFail | Sorry, we are experiencing technical difficulties. Please try your call again. Goodbye. | say_TechDiffAPIFail | 5/22/2014 Dup |
| 4 | 1 | | GlobalOptions/SystemErrors | TechDiffDBFail | Sorry, we are experiencing technical difficulties. Please try your call again. Goodbye. | say_TechDiffDBFail | 5/22/2014 Dup |
| 11 | | | GlobalOptions/SystemErrors | TechDiffAPIFailM2 | n/a | say_TechDiffDBFail | 5/22/2014 z |

| rename | *. | *.wav |
|---|---|---|
| copy | 3 | SCPYNSalesNI1 |
| copy | 2 | SCPYNSales |
| copy | 4 | SCPYNSalesNI2 |
| copy | 4 | SCPYNSalesNM2 |
| copy | 6 | SalesMenu_1 |
| copy | 5 | SCPYNSalesNM1 |
| copy | 1 | TechDiffVoiceRecDown |
| copy | 1 | TechDiffFatalError |
| copy | 1 | TechDiffAPIFail |
| copy | 1 | TechDiffDBFail |
| rename | *. | *.wav |

| 3 | SCPYNSalesNI1 |
|---|---|
| 2 | SCPYNSales |
| 4 | SCPYNSalesNI2 |
| 4 | SCPYNSalesNM2 |
| 6 | SalesMenu_1 |
| 5 | SCPYNSalesNM1 |
| 1 | TechDiffVoiceRecDown |
| 1 | TechDiffFatalError |
| 1 | TechDiffAPIFail |
| 1 | TechDiffDBFail |

| Name | Date modified | Type | Size |
|---|---|---|---|
| 1 | 9/25/2014 3:33 PM | Wave Audio | 14 KB |
| 2 | 9/25/2014 3:33 PM | Wave Audio | 12 KB |
| 3 | 9/25/2014 3:33 PM | Wave Audio | 22 KB |
| 4 | 9/25/2014 3:33 PM | Wave Audio | 11 KB |
| 5 | 9/25/2014 3:34 PM | Wave Audio | 11 KB |
| 6 | 9/25/2014 3:34 PM | Wave Audio | 9 KB |
| 7 | 9/25/2014 3:34 PM | Wave Audio | 11 KB |
| 8 | 9/25/2014 3:34 PM | Wave Audio | 11 KB |
| 9 | 9/25/2014 3:34 PM | Wave Audio | 11 KB |
| 10 | 9/25/2014 3:34 PM | Wave Audio | 18 KB |
| SalesRetentionCopy | 9/22/2014 12:14 PM | Windows Batch File | 27 KB |

| Name | Date modified | Type | Size |
|---|---|---|---|
| 1 | 9/25/2014 3:33 PM | Wave Audio | 14 KB |
| 2 | 9/25/2014 3:33 PM | Wave Audio | 12 KB |
| 3 | 9/25/2014 3:33 PM | Wave Audio | 22 KB |
| 4 | 9/25/2014 3:33 PM | Wave Audio | 11 KB |
| 5 | 9/25/2014 3:34 PM | Wave Audio | 11 KB |
| 6 | 9/25/2014 3:34 PM | Wave Audio | 9 KB |
| 7 | 9/25/2014 3:34 PM | Wave Audio | 11 KB |
| 8 | 9/25/2014 3:34 PM | Wave Audio | 11 KB |
| 9 | 9/25/2014 3:34 PM | Wave Audio | 11 KB |
| 10 | 9/25/2014 3:34 PM | Wave Audio | 18 KB |
| AddServiceMenu_1 | 9/25/2014 3:33 PM | Wave Audio | 14 KB |
| AddServiceMenu_2 | 9/25/2014 3:33 PM | Wave Audio | 11 KB |
| AddServiceMenu_3 | 9/25/2014 3:34 PM | Wave Audio | 11 KB |
| AddServiceMenu_4 | 9/25/2014 3:34 PM | Wave Audio | 9 KB |
| AddServiceMenu_5 | 9/25/2014 3:34 PM | Wave Audio | 11 KB |
| AddServiceMenu_6 | 9/25/2014 3:34 PM | Wave Audio | 11 KB |
| AddServiceMenu_7 | 9/25/2014 3:34 PM | Wave Audio | 11 KB |
| AddServiceMenu_10 | 9/25/2014 3:33 PM | Wave Audio | 12 KB |
| AddServiceMenu_11 | 9/25/2014 3:33 PM | Wave Audio | 22 KB |
| AddServiceMenuN1_1 | 9/25/2014 3:34 PM | Wave Audio | 18 KB |
| SalesRetentionCopy | 9/22/2014 12:14 PM | Windows Batch File | 27 KB |

Fig. 14

| PL Order | Batch Order | Record Order | Page Name | Prompt Name | Prompt Text | Spanish Translation | State Name | Date Changed |
|---|---|---|---|---|---|---|---|---|
| | | | Bravo path: /voice/audio/comcast/ENR/ | | | | | |
| 1 | 1 | 1 | GlobalOptions/SystemErrors | TechDiffVoiceRecDown | Sorry, we are experiencing technical difficulties. Please try your call again. Goodbye. | | say_TechDiffVoiceRecDown | 5/22/2014 |
| 5 | 2 | 2 | Sales | SCPYNSales | Are you calling about your Seasonal Convenience Plan? Please say yes or no. | | prompt_SCPYNSales | 8/18/2014 |
| 6 | 3 | 3 | Sales | SCPYNSalesRM1 | Again, are you calling about your Seasonal Convenience Plan? Please say yes or no. | | prompt_SCPYNSales | 8/18/2014 |
| 7 | 4 | 4 | Sales | SCPYNSalesRM2 | If you're calling about your Seasonal Convenience Plan, press 1. Otherwise, press 2. | | prompt_SCPYNSales | 8/18/2014 |
| 8 | 5 | 5 | Sales | SCPYNSalesNM1 | Sorry, just say yes or no. Are you calling about your Seasonal Convenience Plan? | | prompt_SCPYNSales | 8/18/2014 |
| 10 | 6 | 6 | Sales | SalesMenu_1 | Now you can say: 'add new service', 'change existing service'. | | prompt_SalesMenu | 9/12/2014 |
| 9 | 4 | | Sales | SCPYNSalesNM2 | If you're calling about your Seasonal Convenience Plan, press 1. Otherwise, press 2. | | prompt_SCPYNSales | 8/18/2014 Dup |
| 2 | 1 | | GlobalOptions/SystemErrors | TechDiffFatalError | Sorry, we are experiencing technical difficulties. Please try your call again. Goodbye. | | say_TechDiffFatalError | 5/22/2014 Dup |
| 3 | 1 | | GlobalOptions/SystemErrors | TechDiffAPIFail | Sorry, we are experiencing technical difficulties. Please try your call again. Goodbye. | | say_TechDiffAPIFail | 5/22/2014 Dup |
| 4 | 1 | | GlobalOptions/SystemErrors | TechDiffDBFail | Sorry, we are experiencing technical difficulties. Please try your call again. Goodbye. | | say_TechDiffDBFail | 5/22/2014 Dup |

| PL Order | Batch Order | Record Order | Page Name | Prompt Name | Prompt Text | Spanish Translation | State Name | Date Changed | Record Order | Prompt Text | Spanish Translation |
|---|---|---|---|---|---|---|---|---|---|---|---|
| 1 | 1 | 1 | GlobalOptions/Syst emErrors<br>Breve path: /voice/audio/common/ENEN/ | TechDiffVoiceRec Down | Sorry, we are experiencing technical difficulties. Please try your call again. Goodbye. | | say_TechDiffVoiceRecD | 5/22/2014 | 1 | Sorry, we are experiencing technical difficulties. Please try your call again. Goodbye. | Translation 1 |
| 2 | 2 | 2 | Sales | SCPYNSales | Are you calling about your Seasonal Convenience Plan? Please say yes or no. | | prompt_SCPYNSales | 8/18/2014 | 2 | Are you calling about your Seasonal Convenience Plan? Please say yes or no. | Translation 2 |
| 3 | 3 | 3 | Sales | SCPYNSales-NR1 | Again, are you calling about your Seasonal Convenience Plan? Please say yes or no. | | prompt_SCPYNSales | 8/18/2014 | 3 | Again, are you calling about your Seasonal Convenience Plan? Please say yes or no. | Translation 3 |
| 4 | 4 | 4 | Sales | SCPYNSales-NR2 | If you're calling about your Seasonal Convenience Plan, press 1. Otherwise, press 2. | | prompt_SCPYNSales | 8/18/2014 | 4 | If you're calling about your Seasonal Convenience Plan, press 1. Otherwise, press 2. | Translation 4 |
| 5 | 5 | 5 | Sales | SCPYNSales-NM1 | Sorry, just say yes or no. Are you calling about your Seasonal Convenience Plan? | | prompt_SCPYNSales | 8/18/2014 | 5 | Sorry, just say yes or no. Are you calling about your Seasonal Convenience Plan? | Translation 5 |
| 6 | 6 | 6 | Sales | Sales-Menu_1 | Now you can say: 'add new service', 'change existing service'. | | prompt_SalesMenu | 8/12/2014 | 6 | Now you can say: 'add new service', 'change existing service'. | Translation 6 |
| 9 | 7 | | Sales | SCPYNSales-NM2 | If you're calling about your Seasonal Convenience Plan, press 1. Otherwise, press 2. | | prompt_SCPYNSales | 8/18/2014 | Stop | | |
| 2 | 1 | | GlobalOptions/Syst emErrors | TechDiffFatalError | Sorry, we are experiencing technical difficulties. Please try your call again. Goodbye. | | say_TechDiffFatalError | 5/22/2014 | Stop | | |
| 3 | 1 | | GlobalOptions/Syst emErrors | TechDiffAPIFail | Sorry, we are experiencing technical difficulties. Please try your call again. Goodbye. | | say_TechDiffAPIFail | 5/22/2014 | Stop | | |
| 4 | 1 | | GlobalOptions/Syst emErrors | TechDiffDBFail | Sorry, we are experiencing technical difficulties. Please try your call again. Goodbye. | | say_TechDiffDBFail | 5/22/2014 | Stop | | |

| PL Order | Batch Order | Record Order | Page Name | Prompt Name | Prompt Text | Spanish Translation | State Name | Date Changed | | |
|---|---|---|---|---|---|---|---|---|---|---|
| | | | Bravo path: /voice/audio/comcast/EVR/ | | | | | | | |
| 6 | 1 | 3 | Sales | SCPYNSalesR3 | Again, are you calling about your Seasonal Convenience Plan? Please say yes or no. | | prompt_SCPYNSales | 8/18/2014 | 6 | 3 | Translation 3 |
| 5 | 2 | 1 | Sales | SCPYNSales | Are you calling about your Seasonal Convenience Plan? Please say yes or no. | | prompt_SCPYNSales | 8/18/2014 | 6 | 2 | Translation 2 |
| 7 | 3 | 4 | Sales | SCPYNSalesR2 | If you're calling about your Seasonal Convenience Plan, press 1. Otherwise, press 2. | | prompt_SCPYNSales | 8/18/2014 | 6 | 4 | Translation 4 |
| 9 | 4 | | Sales | SCPYNSalesNAME | If you're calling about your Seasonal Convenience Plan, press 1. Otherwise, press 2. | | prompt_SCPYNSales | 8/18/2014 | Sup | | |
| 10 | 5 | 6 | Sales | SalesMenu_1 | Now you can say: 'add new service', 'change existing service'. | | prompt_SalesMenu | 9/12/2014 | 6 | 6 | Translation 6 |
| 8 | 6 | 5 | Sales | SCPYNSalesN1 | Sorry, just say yes or no. Are you calling about your Seasonal Convenience Plan? | | prompt_SCPYNSales | 8/18/2014 | 9 | 5 | Translation 5 |
| 4 | 1 | 1 | GlobalOptions/SystemErrors | TechDiffVoiceRecDown | Sorry, we are experiencing technical difficulties. Please try your call again. Goodbye. | | say_TechDiffVoiceRecDown | 5/22/2014 | 6 | 1 | Translation 1 |
| 2 | 2 | | GlobalOptions/SystemErrors | TechDiffStateError | Sorry, we are experiencing technical difficulties. Please try your call again. Goodbye. | | say_TechDiffStateError | 5/22/2014 | Sup | | |
| 3 | 3 | | GlobalOptions/SystemErrors | TechDiffAPIFail | Sorry, we are experiencing technical difficulties. Please try your call again. Goodbye. | | say_TechDiffAPIFail | 5/22/2014 | Sup | | |
| 4 | 4 | | GlobalOptions/SystemErrors | TechDiffDBFail | Sorry, we are experiencing technical difficulties. Please try your call again. Goodbye. | | say_TechDiffDBFail | 5/22/2014 | Sup | | |

| Prompt Name | Prompt Text<br>Bravo path: /voice/audio/Comcast/IVR/ | Spanish Translation | State Name | Date Changed | | | |
|---|---|---|---|---|---|---|---|
| SCPYNSalesRM1 | Again, are you calling about your Seasonal Convenience Plan? Please say yes or no. | Translation 3 | prompt_SCPYNSales | 8/18/2014 | 3 | Again, are you calling about your Seasonal Convenience Plan? Please say yes or no. | Translation 3 | Translation 3 |
| SCPYNSales | Are you calling about your Seasonal Convenience Plan? Please say yes or no. | Translation 2 | prompt_SCPYNSales | 8/18/2014 | 2 | Are you calling about your Seasonal Convenience Plan? Please say yes or no. | Translation 2 | Translation 2 |
| SCPYNSalesNM1 | If you're calling about your Seasonal Convenience Plan, press 2. | Translation 4 | prompt_SCPYNSales | 8/18/2014 | 4 | If you're calling about your Seasonal Convenience Plan, press 2. Otherwise, press 2. | Translation 4 | Translation 4 |
| SCPYNSalesNM2 | If you're calling about your Seasonal Convenience Plan, press 1. | Translation 4 | prompt_SCPYNSales | 8/18/2014 | Dup | | | Translation 4 |
| SalesMenu_1 | Now you can say: 'add new service', 'change existing service'. | Translation 6 | prompt_SalesMenu | 9/12/2014 | 6 | Now you can say: 'add new service', 'change existing service'. | Translation 6 | Translation 6 |
| SCPYNSales1 | Sorry, just say yes or no. Are you calling about your Seasonal Convenience Plan? | Translation 5 | prompt_SCPYNSales | 8/18/2014 | 5 | Sorry, just say yes or no. Are you calling about your Seasonal Convenience Plan? | Translation 5 | Translation 5 |
| TechDiffVoiceRecDown | Sorry, we are experiencing technical difficulties. Please try your call again. Goodbye. | Translation 1 | say_TechDiffVoiceRecDown | 5/22/2014 | 1 | Sorry, we are experiencing technical difficulties. Please try your call again. Goodbye. | Translation 1 | Translation 1 |
| TechDiffFatalError | Sorry, we are experiencing technical difficulties. Please try your call again. Goodbye. | Translation 1 | say_TechDiffFatalError | 5/22/2014 | Dup | | | Translation 1 |
| TechDiffAPIFail | Sorry, we are experiencing technical difficulties. Please try your call again. Goodbye. | Translation 1 | say_TechDiffAPIFail | 5/22/2014 | Dup | | | Translation 1 |
| TechDiffDBFail | Sorry, we are experiencing technical difficulties. Please try your call again. Goodbye. | Translation 1 | say_TechDiffDBFail | 5/22/2014 | Dup | | | Translation 1 |

1800

SCRIPT UNIQUE PROMPTS

BACKGROUND

The present disclosure is generally related to the script logic assembly, more specifically, to removing duplicate prompts and uniquely naming duplicate prompts.

To increase call center customer satisfaction, interactive voice response (IVR) requires accurate timely information for timely accurate responses. This timely and accurate response by the IVR is enabled by continuous flow of information to and from the system in the form of a script. The script allows the IVR to handle objections, answer questions and gather information in an efficient process. The script as a whole is comprised of individual panels which have instructions, information and data queries. These individual panels are comprised in part of prompts. The prompts may be duplicated depending on the panel and their reproduction for translation and recording is time consuming and complex.

Therefore, a means to reduce time for audio and translation work based on removing duplicates for translation and recording and uniquely naming duplicate prompts would save time and reduce errors.

SUMMARY

In one embodiment, a method, comprising at least one of, sequencing, by a processor, at least one script in a design order having at least one prompt, identifying, by the processor, duplicate prompts of the at least one prompt, identifying, by the processor, unique prompts of the at least one prompt, translation tagging, by the processor, the identified unique prompts and replicating, by the processor, the translation tagged unique prompts to the identified duplicate prompts.

In another embodiment, a non-transitory computer readable medium comprising instructions that when read by a processor perform at least one of, sequencing at least one script in a design order having at least one prompt, identifying duplicate prompts of the at least one prompt, identifying unique prompts of the at least one prompt, translation tagging the identified unique prompts and replicating the translation tagged unique prompts to the identified duplicate prompts.

In a further embodiment, a system, comprising, a processor, wherein the processor configure to perform at least one of, sequences at least one script in a design order having at least one prompt, identifies duplicate prompts of the at least one prompt, identifies unique prompts of the at least one prompt, translation tags the identified unique prompts and replicates the translation tagged unique prompts to the identified duplicate prompts and a non-transitory memory communicably coupled to the processor, wherein the memory stores the translation tagged unique prompts.

BRIEF DESCRIPTION OF THE DRAWINGS

FIG. 4 depicts an example overview in accordance with one embodiment of the disclosure;

FIG. 5 depicts an example first step in accordance with one embodiment of the disclosure;

FIG. 6 depicts an example second step in accordance with one embodiment of the disclosure;

FIG. 7 depicts an example third step in accordance with one embodiment of the disclosure;

FIG. 8 depicts an example fourth step in accordance with one embodiment of the disclosure;

FIG. 9 depicts an example fifth step in accordance with one embodiment of the disclosure;

FIG. 10 depicts an example sixth step in accordance with one embodiment of the disclosure;

FIG. 11 depicts an example seventh step in accordance with one embodiment of the disclosure;

FIG. 13 depicts an example second batch in accordance with one embodiment of the disclosure;

FIG. 14 depicts a batch activation example in accordance with one embodiment of the disclosure;

FIG. 15 depicts a first insert translation example in accordance with one embodiment of the disclosure;

FIG. 16 depicts a second insert translation example in accordance with one embodiment of the disclosure;

FIG. 17 depicts a third insert translation example in accordance with one embodiment of the disclosure; and FIG. 18 depicts a fourth insert translation example in accordance with one embodiment of the disclosure.

DETAILED DESCRIPTION

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

The disclosure discusses in part an application resident on a user device. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer, a laptop, a personal computing tablet, a smartphone or a device with a processor and memory.

Figure 1:
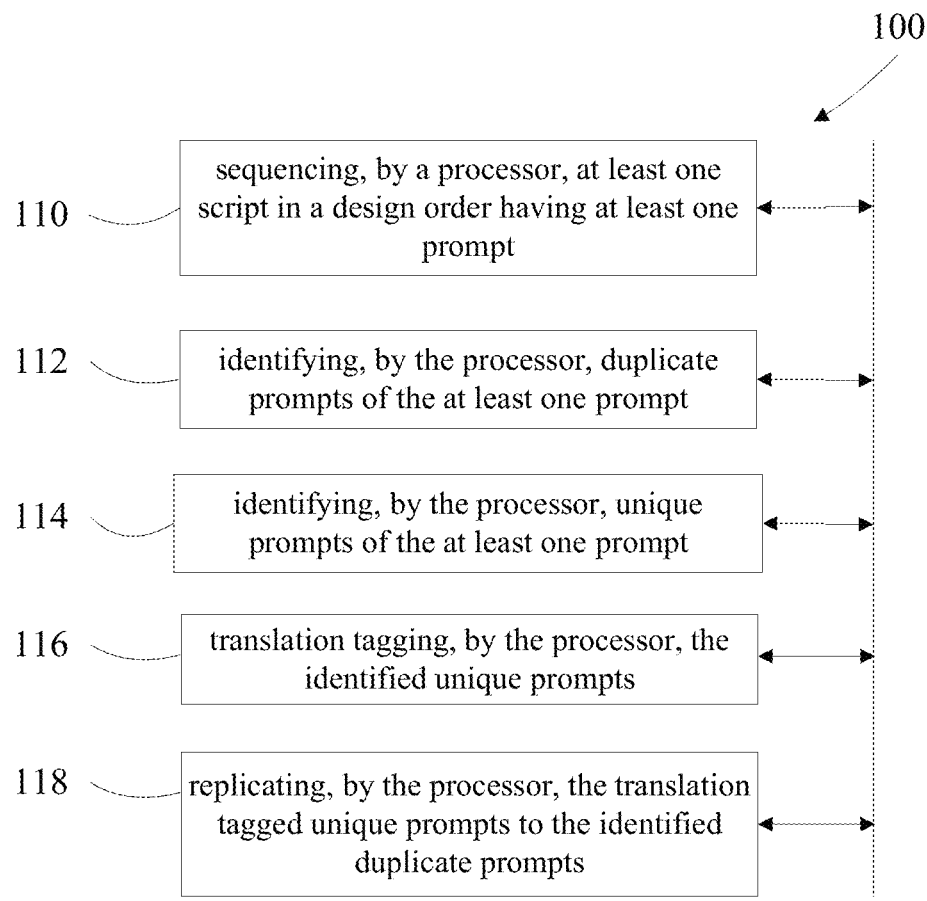
FIG. 1 depicts a first embodiment of a method in accordance with one embodiment of the disclosure.

Referring now to FIG. 1, a method, comprising, sequencing 110, by a processor, at least one script in a design order having at least one prompt, identifying 112, by the processor, duplicate prompts of the at least one prompt, identifying 114, by the processor, unique prompts of the at least one prompt, translation tagging 116, by the processor, the identified unique prompts and replicating 118, by the processor, the translation tagged unique prompts to the identified duplicate prompts. The method is performed by software, hardware, firmware, and/or the combination of software, hardware, and/or firmware.

The method may have at least one prompt having at least one prompt text and reordering, by the processor, the at least one prompt based on the at least one prompt text and assembling, by the processor, the at least one script in the design order based on the translated unique prompts. The method may also comprise creating, by the processor, a record document based on the design order, creating, by the processor, a translation document based on the design order, reordering, by the processor, based on a content of the at least one prompt and intermixing, by the processor, the reordered content to indicate at least one prompt to be replicated.

Figure 2:
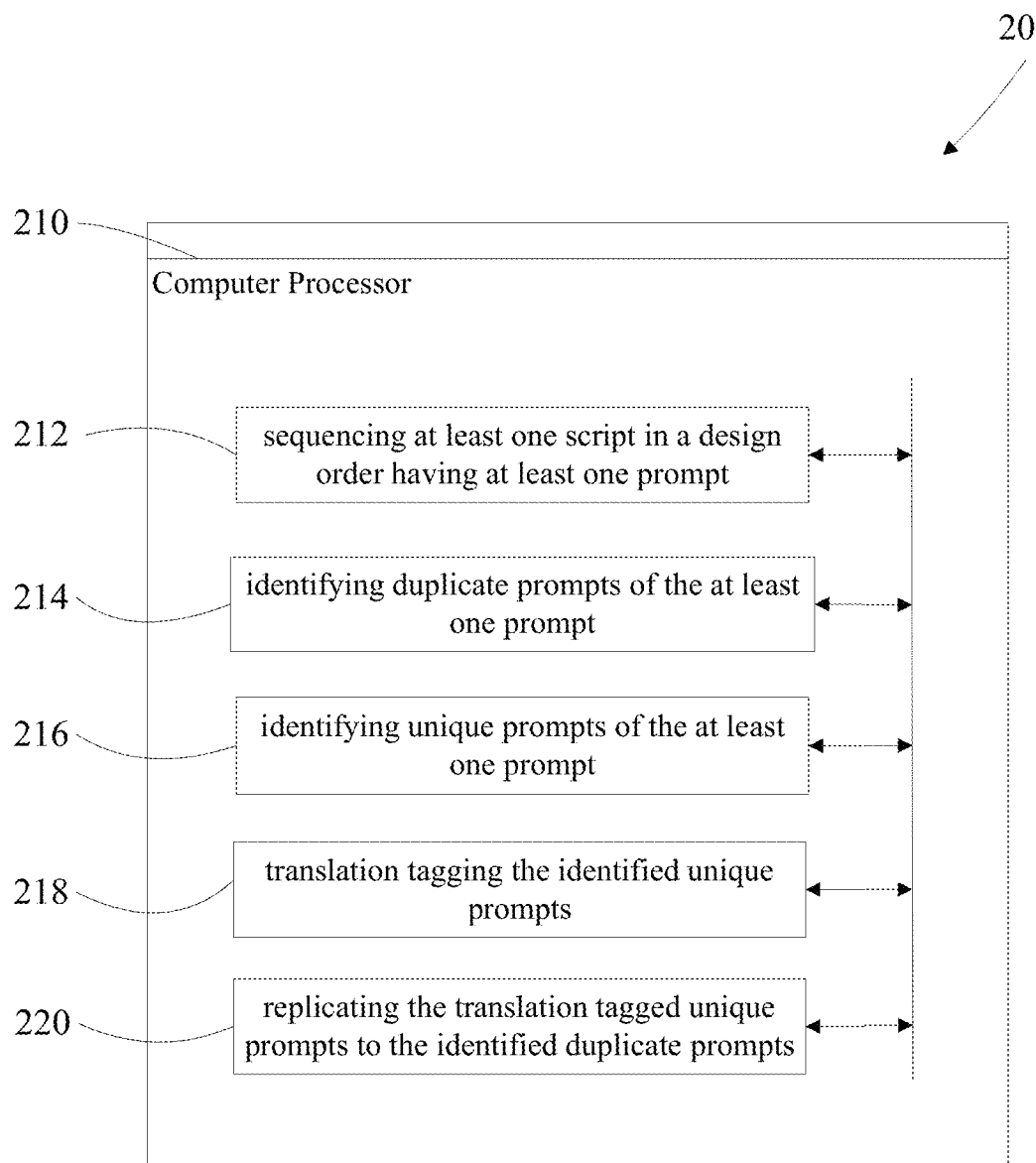
FIG. 2 depicts a second embodiment of a non-transitory computer readable medium in accordance with one embodiment of the disclosure.

Referring now to FIG. 2, a non-transitory computer readable medium comprising instructions that when read by a processor 210 perform, sequencing 212 at least one script in a design order having at least one prompt, identifying 214 duplicate prompts of the at least one prompt, identifying 216 unique prompts of the at least one prompt, translation tagging 218 the identified unique prompts and replicating 220 the translation tagged unique prompts to the identified duplicate prompts.

The non-transitory computer readable medium may have at least one prompt having at least one prompt text and reordering the at least one prompt based on the at least one prompt text and assembling the at least one script in the design order based on the translated unique prompts. The non-transitory computer readable medium may further comprise creating a record document based on the design order, creating a translation document based on the design order, reordering a content of the at least one prompt and intermixing the reordered content to indicate at least one prompt to be replicated.

Figure 3:
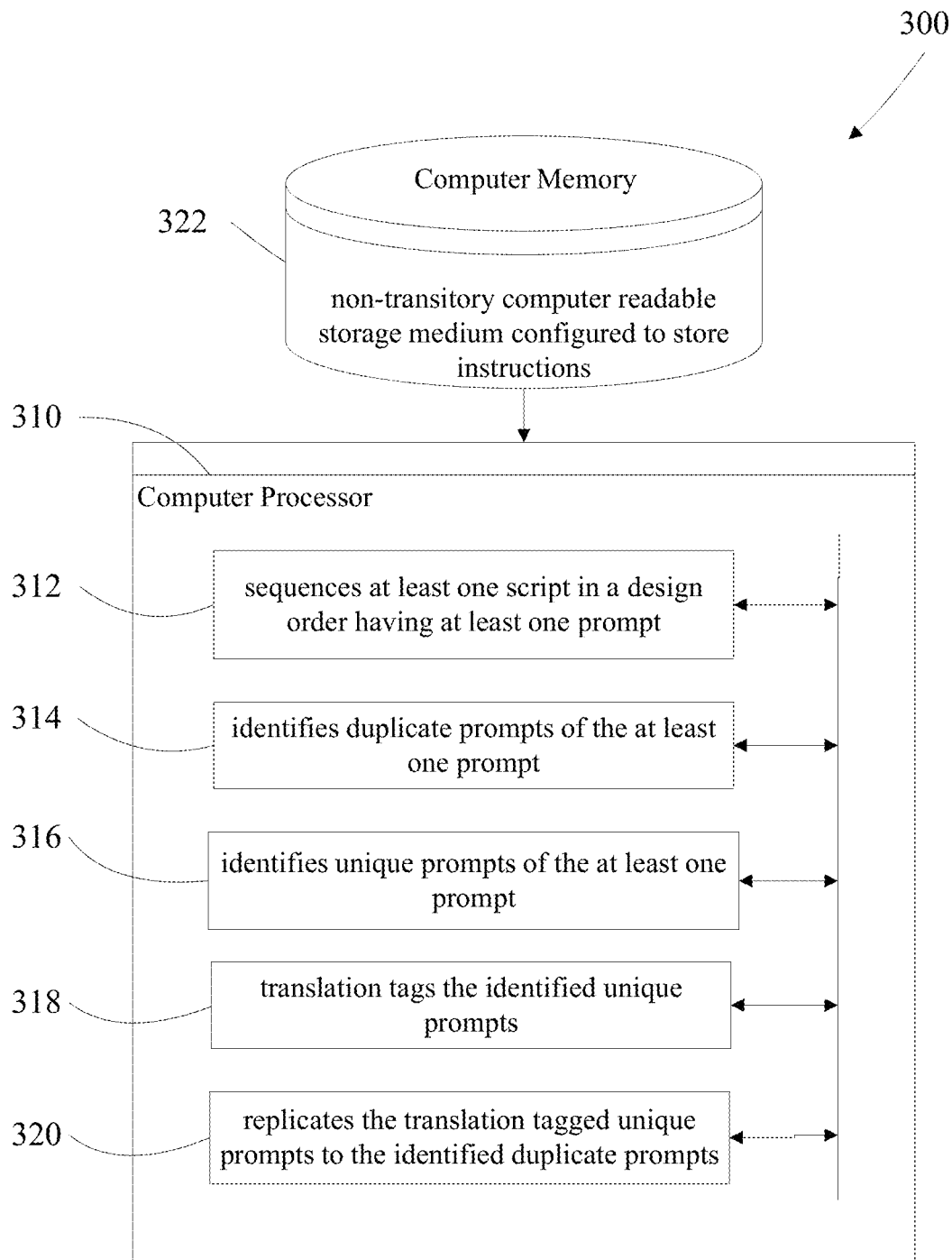
FIG. 3 depicts a third embodiment of a system in accordance with one embodiment of the disclosure.

Referring now to FIG. 3, a system, comprising, a processor 310, wherein the processor, sequences 312 at least one script in a design order having at least one prompt, identifies 314 duplicate prompts of the at least one prompt, identifies 316 unique prompts of the at least one prompt, translation tags 318 the identified unique prompts and replicates 320 the translation tagged unique prompts to the identified duplicate prompts and a non-transitory memory 322 communicably coupled to the processor, wherein the memory stores the translation tagged unique prompts.

The system processor may also assemble the at least one script in the design order based on the translated unique prompt, create a record document based on the design order, create a translation document based on the design order, reorder based on a content of the at least one prompt and intermix a reordered content to indicate at least one prompt to be replicated.

The method allows elimination of duplicate prompts. Numeric prompt names may be used to build a batch list and rename scripts to match the prompts in the script design, thereby eliminating errors during the build. The method also allows duplicate prompts which were earlier eliminated to be rebuilt and added in the same order as the original export.

An example step A may add a blank column and insert a number sequence in the originally exported order, to allow reversion back to the original export order later in the process.

An example step B may reorder based on the descriptive prompt text so as to group duplicate prompts together, then identify the duplicate prompts.

An example step C may reorder unique prompts in a design order sequence to create record documents and translation documents. The design order may be numbered out of sequence due to the removal of duplicate prompts, so an additional blank column may be added so as to number the sequence for recording.

An example step D may reorder based on the prompt content, showing unique and duplicate prompts intermixed to create a batch replication script that may auto-replicate unique prompts to their duplicates with unique prompt names.

An example step E may translate unique prompts.

An example step F may insert unique translations into a prompt list. Inserting the translations in record order adjacent to the working grid prompts to be similarly reordered based on slot content, mixing the unique and duplicate prompts to indicate the duplicated fill in.

An example step G may save the working grid as the final translation grid, remove the sequencing columns and the duplicate identification formula column providing a format for export.

Referring to FIG. 4, depicts an example overview. The prompt list may resemble FIG. 4 at the time of export. Duplicate prompts in this example are removed from translation/recording to reduce cost and time and to reassemble the grid to its original format so that any translations or prompt changes may be imported.

Referring to FIG. 5, depicts an example first step. The first step adds three (3) columns adjacent to the Page Name and sequentially numbers the Export Order column.

Referring to FIG. 6, depicts an example second step. In this step the prompt text is reordered to identify duplicate prompts, leaving Export Order column scrambled. This will allow a reordering to the original the Prompt List order. The following formula may be used to identify duplicates.

=IF(f3="n/a","z",if(f3=f2,"Dup","a"))

An "a" will populate the cells that are unique, while "Dup" will indicate the repeated cells. "z" will mark prompts not having usable content.

Referring to FIG. 7, depicts an example third step. The results of the second step are replicated and stored back in the same cells. The content in the columns may change before saving the formula results as value. After the results have been re-stored as a value, prompts not having values are identified. A "z" value is placed adjacent prompts not containing usable content so that they may be eliminated from the record document.

Referring to FIG. 8, an example fourth step is depicted. The rows are reordered with a secondary reorder based on the Export Order column so the unique prompts are in the order they were exported from the design. The resulting reorder will place the "z" marked prompts toward the bottom of the grid, "Dup" will be grouped toward the middle, and "a", or Unique Prompts will be grouped toward the top.

Referring to FIG. 9, an example fifth step is depicted. The Record Order column is sequentially marked. This may be used to name the prompts when editing and to create a batch rename document to ultimately rename them to their prompt list names.

Referring to FIG. 10, an example sixth step is depicted. Column F is re-reordered. The duplicate prompts are then reordered to create the batch replication document. The Record Order column may include blanks where the duplicate prompts are.

The Prompt List may be selected other than the "z" prompts. The rows with "Dup" in the may have a repeated number in the Batch Order column. Repeating step 4, the contents of the Batch Order column are replicated and re-stored in the same cells.

Referring to FIG. 11, an example seventh step is depicted. The rows are reordered based on the Record Order column which will put the grid in the proper order for translating or recording. The duplicate rows may be deleted as well as additional working columns. The Record Order and the Prompt Text columns have been placed in a format to record in English, or a language translation.

Figure 12:
FIG. 12 depicts an example first batch in accordance with one embodiment of the disclosure.

Referring to FIG. 12, an example first batch is depicted. Additional working columns B, C, D, are deleted placing Batch Order and Prompt Name columns in the correct format.

Referring to FIG. 13, an example second batch is depicted. The first command removes the .wav extension from finished audio prompts.

Referring to FIG. 14, depicts a batch activation example. The contents of the folder contains the numbered prompts. The Batch file is activated and replicates the numbered prompts to their actual names. An example end result is shown toward the bottom of FIG. 14.

Referring to FIG. 15, depicts an example first translation insertion. The rows with content may be selected, after the working grid, and the translation document has been reordered in record order. This will align the columns to rebuild the prompt list, with the translation.

Referring to FIG. 16, depicts an example second translation insertion. After the working grid is reordered in record order, the three (3) columns in the translation document may be inserted adjacent to column J in the working grid.

A: Record Order
   B: English verbiage
   C: Spanish Translation

Referring to FIG. 17, an example third translation insertion is depicted. In this example the rows with content may be reordered based on column F, Prompt Text. Gaps in the Spanish translation align with "Dup" in column I.

Referring to FIG. 18, depicts an example fourth translation insertion. The duplicate translations that were not previously translated are to be filled in. The following formula may be used:
   =IF(I3="Dup", M2, L3)
This formula will either take the translation above the cell if it is a duplicate, or to an adjacent cell if it is unique.

Example formulas are shown below.
To find duplicates one possible formula may be placed in a column adjacent to the first row with prompt content.
   =IF(F3="n/a","z",IF(F3=F2,"Dup","a"))
   a=unique prompt
   Dup=duplicated content
   z=nothing to record
To create a batch order one possible may be used
   =IF(I3="Dup",B2,C3)
   B2=Batch replication Source prompt
   C3=Unique Prompt
To insert a translation the following formula may be used:
   =IF(I3="Dup",M2,L3)
   M2=Replication translation from above duplicate
   L3=Unique translated prompt, to move to Column M Those skilled in the art will understand that the format, layout, and content of the data structure as shown in the figures is illustrative rather than limiting of the instant invention. Specifically, those skilled in the art will recognize that various changes, modifications, additions, omissions, or alterations may be made to the data structure shown without departing from the scope of the instant invention as recited in the claims appended hereto. More particularly, fields, rows, or columns made be added, modified, reconfigured, or deleted from the data structure as shown without departing from the scope of the instant invention.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, this may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

The above examples are for illustrative purposes and are not intended to limit the scope of the disclosure or the adaptation of the features described herein to particular components. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced by examples in addition to those specifically described.

What is claimed is:
1. A method, comprising:
   identifying at least one script organized in a grid stored in memory;
   sequencing, by a processor, the at least one script in the grid in a design order having at least one prompt;
   identifying, by the processor, duplicate prompts requiring removal among the at least one prompt;
   identifying, by the processor, unique prompts of the at least one prompt;
   translation tagging, by the processor, the identified unique prompts; and replicating, by the processor, the translation tagged unique prompts to the identified duplicate prompts;

recording changes to the at least one script in the grid without the identified duplicate prompts and saving a record document with the recorded changes.

2. The method of claim 1 further comprising:

assembling, by the processor, the at least one script in the design order based on the translation tagged unique prompts.

3. The method of claim 1 wherein the at least one prompt having at least one prompt text and reordering, by the processor, the at least one prompt based on the at least one prompt text.

4. The method of claim 1 further comprising:

creating, by the processor, the record document based on the design order.

5. The method of claim 1 further comprising:

creating, by the processor, a translation document based on the design order.

6. The method of claim 1 further comprising:

reordering, by the processor, based on a content of the at least one prompt.

7. The method of claim 6 further comprising:

intermixing, by the processor, the reordered content to indicate at least one prompt to be replicated.

8. A non-transitory computer readable medium comprising instructions that when read by a processor perform:

identifying at least one script organized in a grid stored in memory;

sequencing the at least one script in the grid in a design order having at least one prompt;

identifying duplicate prompts requiring removal among the at least one prompt;

identifying unique prompts of the at least one prompt;

translation tagging the identified unique prompts; and replicating the translation tagged unique prompts to the identified duplicate prompts;

recording changes to the at least one script in the grid without the identified duplicate prompts and saving a record document with the recorded changes.

9. The computer readable medium of claim 8 comprising instructions for:

assembling the at least one script in the design order based on the translation tagged unique prompts.

10. The computer readable medium of claim 8 comprising wherein the at least one prompt having at least one prompt text and reordering the at least one prompt based on the at least one prompt text.

11. The computer readable medium of claim 8 comprising instructions for:

creating the record document based on the design order.

12. The computer readable medium of claim 8 comprising instructions for:

creating a translation document based on the design order.

13. The computer readable medium of claim 8 comprising instructions for:

reordering a content of the at least one prompt.

14. The computer readable medium of claim 13 comprising instructions for:

intermixing the reordered content to indicate at least one prompt to be replicated.

15. A system, comprising:

a processor, wherein the processor, identifies at least one script organized in a grid stored in memory, sequences the at least one script in the grid in a design order having at least one prompt, identifies duplicate prompts requiring removal among the at least one prompt, identifies unique prompts of the at least one prompt, translation tags the identified unique prompts and replicates the translation tagged unique prompts to the identified duplicate prompts; and a non-transitory memory communicably coupled to the processor, wherein the memory records changes to the at least one script in the grid without the identified duplicate prompts and saves a record document with the recorded changes.

16. The system of claim 15 wherein the processor, assembles the at least one script in the design order based on the translation tagged unique prompt.

17. The system of claim 15 wherein the processor, creates the record document based on the design order.

18. The system of claim 15 wherein the processor, creates a translation document based on the design order.

19. The system of claim 15 wherein the processor, reorders based on a content of the at least one prompt.

20. The system of claim 15 wherein the processor, intermixes a reordered content to indicate at least one prompt to be replicated.

* * * * *